3,342,505
TRAILER SUSPENSION
Alan V. Diehl, Granada Hills, Calif.
(11144 Wystone Ave., Northridge, Calif. 91324)
Filed Feb. 12, 1964, Ser. No. 344,493
18 Claims. (Cl. 280—43.18)

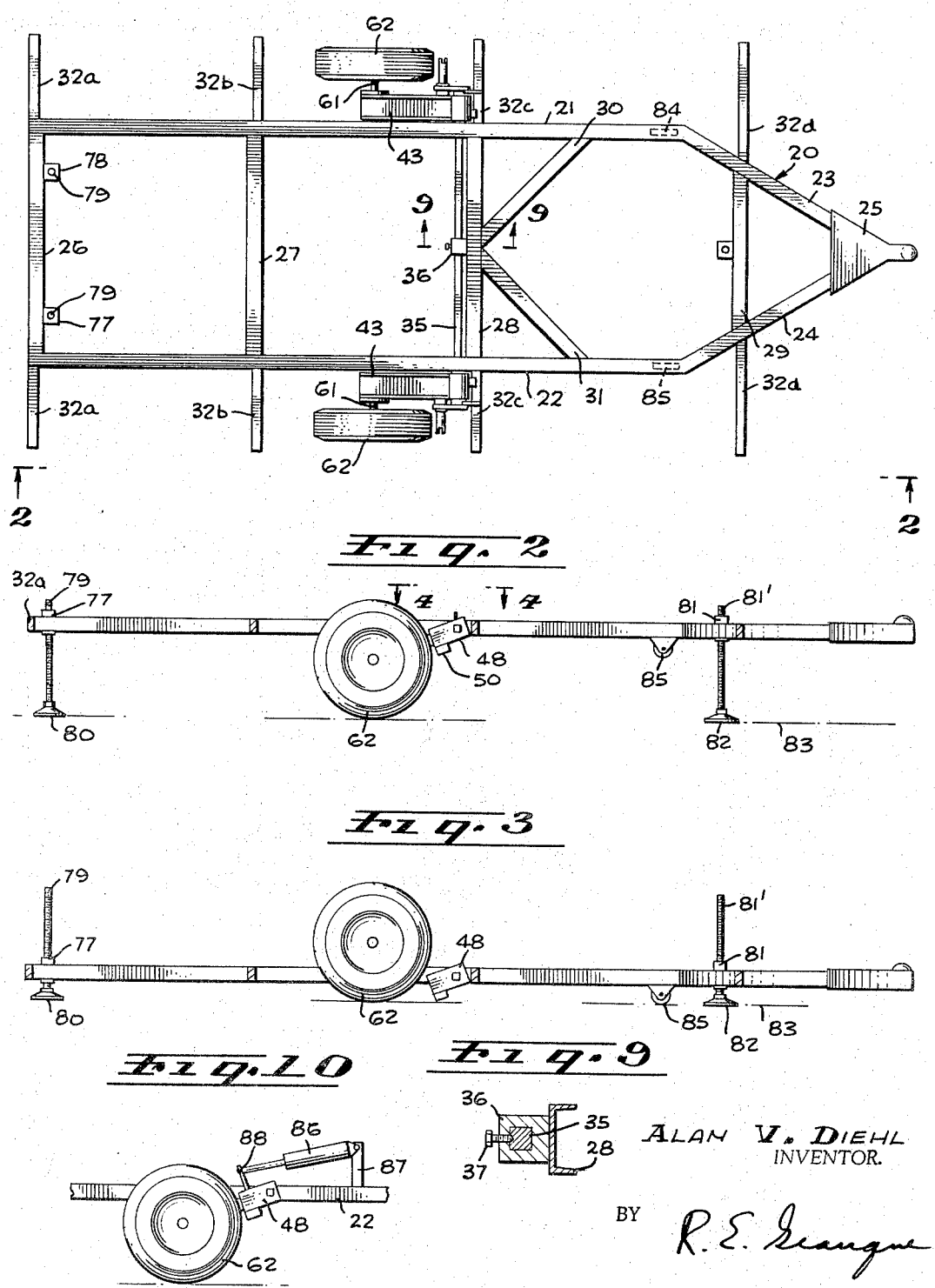

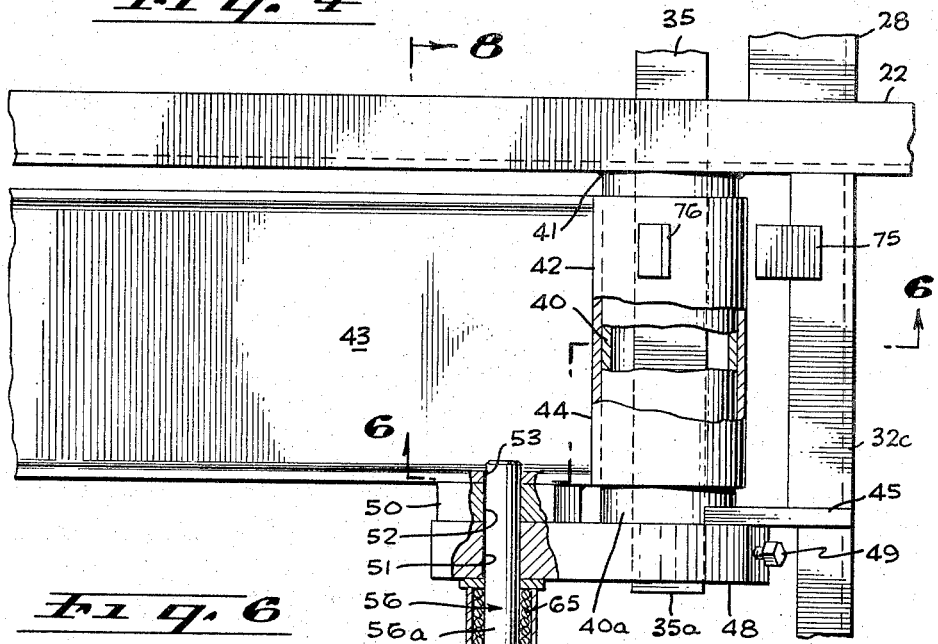
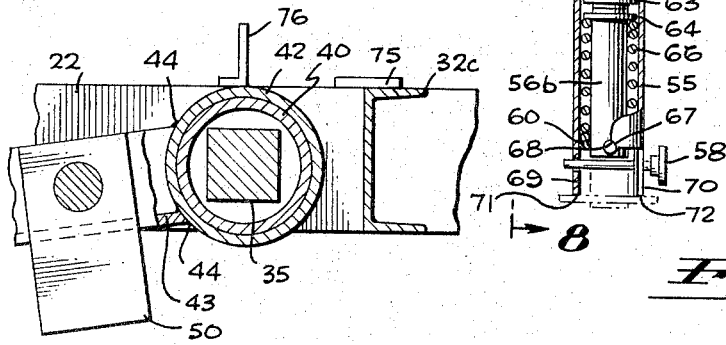
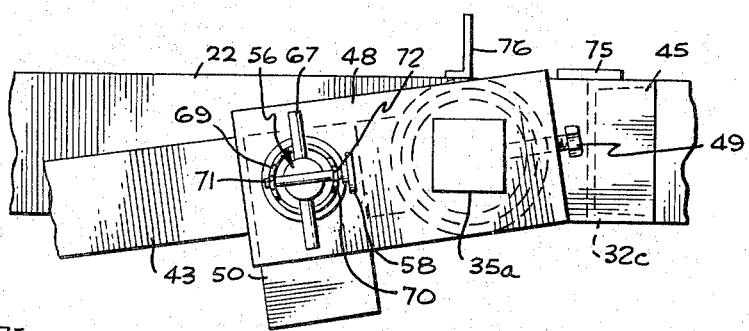
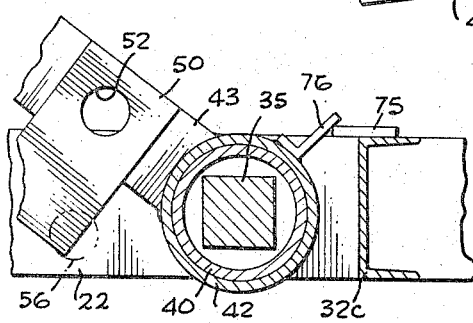
Alan V. Diehl
INVENTOR.

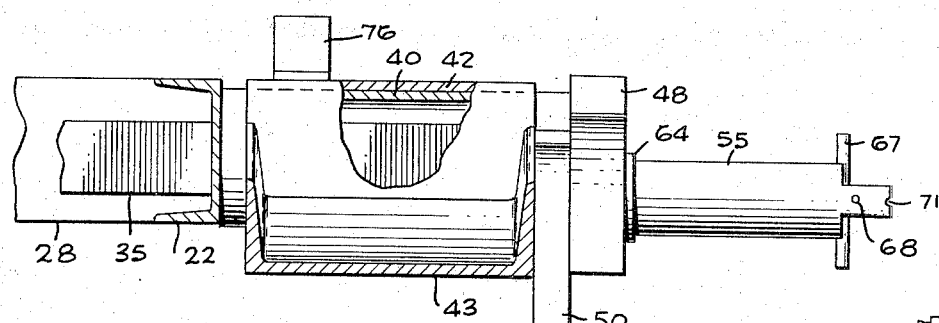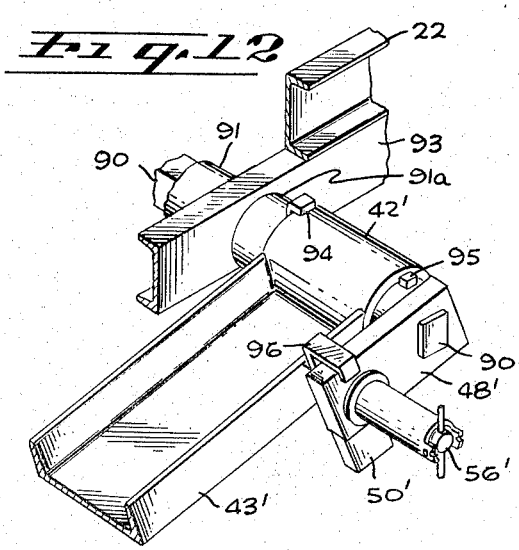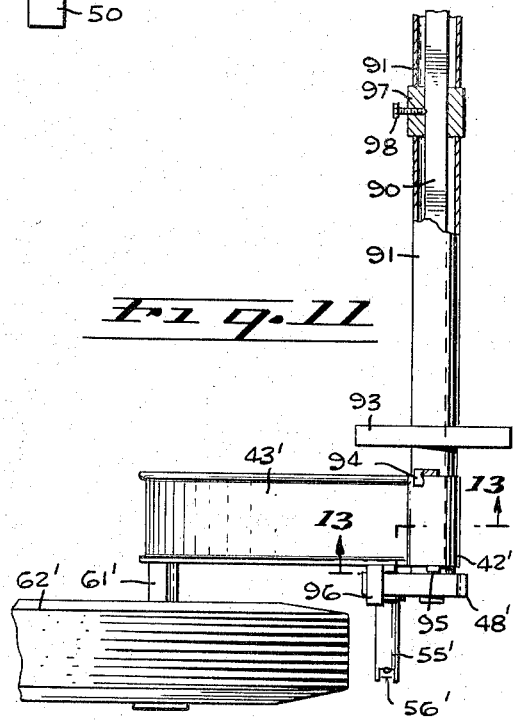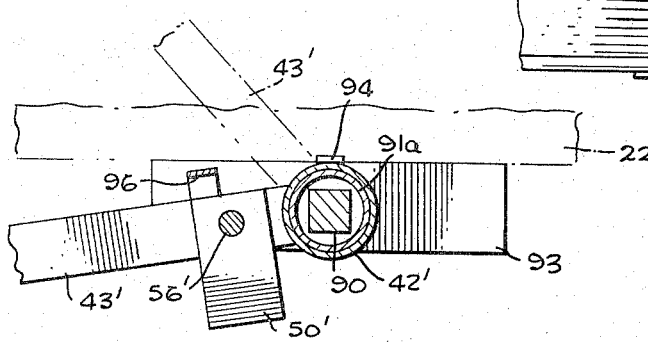

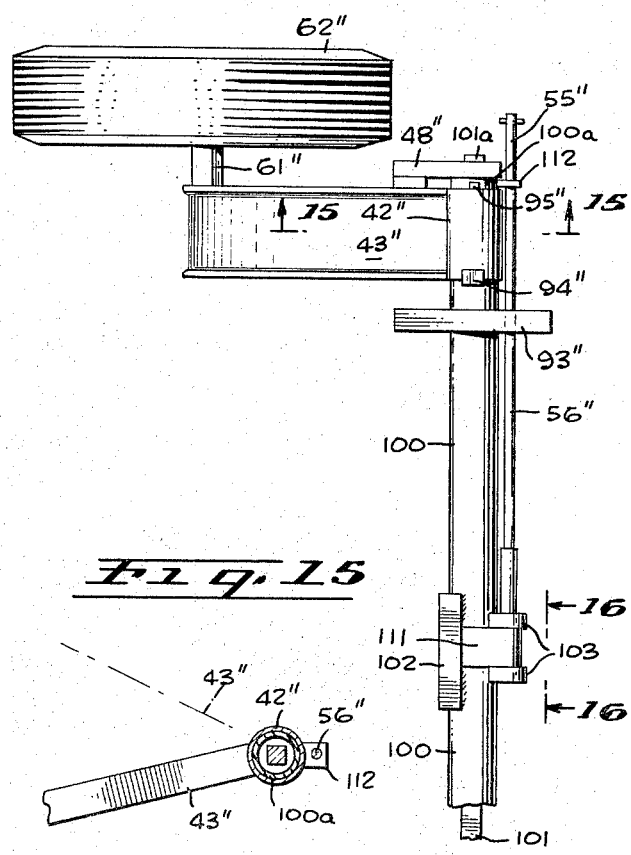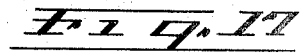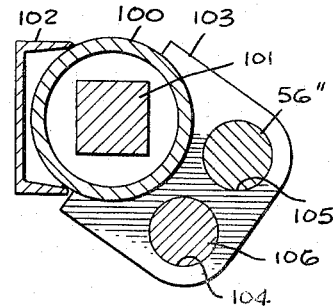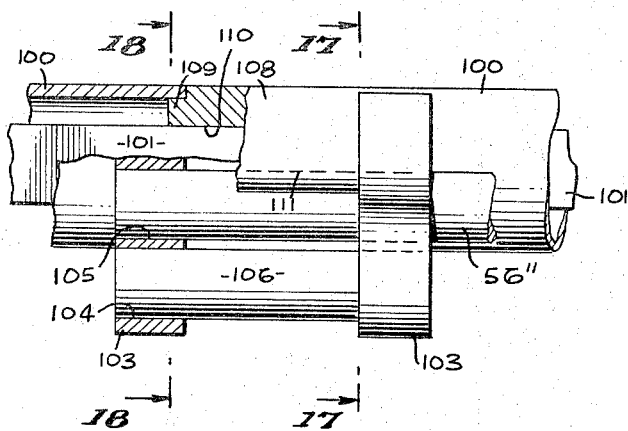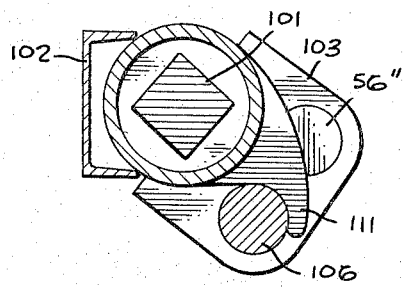

This invention relates to a trailer suspension and more particularly to a trailer suspension which permits the complete trailer to be lowered on its wheels for storage purposes or for permanent placement. At present, the height of some trailers can be reduced by folding down the top of the trailer or by telescoping the top of the trailer into the trailer body. However, the complete trailer body cannot be lowered with respect to the wheels without deforming the trailer body because the trailer suspensions are rigid with the body frames. By the present invention, torsion bar suspension for the trailer is provided which permits the trailer body to be lowered with respect to the wheels by disconnecting a member of the suspension system. In one form of the invention, the torsion bar is rigidly attached to the frame of the trailer and each wheel is releasable from the torsion bar for movement with respect to the trailer body until the body is only several inches off the ground. In another form of the invention, the torsion bar and wheels are rigid with one another and the connection of the torsion bar to the frame is releasable so that both the torsion bar and wheels can move relative to the body of the trailer until the body of the trailer is only several inches above the ground. In both forms of the invention, stops are provided to prevent movement of the wheels to an extent that they will no longer support the trailer body for rolling motion. Auxiliary casters can be provided on the frame of the trailer body so that a trailer body is supported for rolling movement when the body is lowered and unhitched from the pulling vehicle.

It is therefore an object of the present invention to provide a trailer suspension in which the wheels of the trailer can move relative to the body of the trailer to lower the body and still maintain rolling support of the body.

Another object of the invention is to provide a trailer suspension in which a torsion bar is utilized to connect the wheels to the trailer body and in which the wheels are movable relative to the body.

A further object of the invention is to provide a trailer suspension which comprises a torsion bar and wheels releasably connected to the bar for positioning in a normally down position and in a raised position which substantially lowers the body of the trailer.

Another object of the invention is to provide a trailer suspension in which the torsion bar and wheels are connected together and the torsion bar can be released from the vehicle frame to permit the wheels to be raised, thereby lowering the body of the trailer towards the ground.

These and other objects of the invention not specifically set forth above will become readily apparent from the accompanying description and drawings in which:

FIGURE 1 is a top plan view of the lower frame of a trailer with the trailer body removed for purposes of clarity.

FIGURE 2 is a side elevational view taken along line 2—2 of FIGURE 1 showing the vehicle frame with the trailer wheels in the down position.

FIGURE 3 is a side elevational view similar to FIGURE 2 showing the wheels in the raised position thereby locating the frame and trailer body closer to the ground.

FIGURE 4 is an enlarged plan view, partly in section, along line 4—4 of FIGURE 2 illustrating the connection between one of the wheel supporting arms and the torsion bar.

FIGURE 5 is an elevational view along line 5—5 of FIGURE 4 showing the torsion rod and connecting pin.

FIGURE 6 is a vertical section along line 6—6 of FIGURE 4 illustrating the wheel supporting arm in down position.

FIGURE 7 is a view similar to FIGURE 6 wherein the wheel supporting arm is in the raised position with the limit stop engaged.

FIGURE 8 is a transverse vertical section along line 8—8 of FIGURE 4 showing the wheel supporting arm connected with the frame of the trailer.

FIGURE 9 is a vertical section along line 9—9 of FIGURE 1 illustrating the connection between the torsion bar and the frame of the trailer.

FIGURE 10 is a side elevational view similar to FIGURE 2 of a modification wherein the wheel support arm is connected to the frame through a hydraulic actuator.

FIGURE 11 is a top plan view, partly in section, of a modified form of suspension which can be connected to the frame of the trailer as a unit.

FIGURE 12 is a perspective view of the wheel suspension of FIGURE 11 showing the manner in which the suspension is attached to a trailer frame member.

FIGURE 13 is a vertical section along line 13—13 of FIGURE 11 illustrating one of the wheel support arms.

FIGURE 14 is a top plan view of another modified form of suspension which can be connected as a unit to the trailer frame.

FIGURE 15 is a vertical section along line 15—15 of FIGURE 14 illustrating the support for a wheel supporting arm.

FIGURE 16 is an elevational view, partly in section, along line 16—16 of FIGURE 14 showing the latch for connecting and disconnecting the torsion bar and the vehicle frame.

FIGURE 17 is a sectional view along line 17—17 of FIGURE 16 showing the tube support for the torsion bar.

FIGURE 18 is a sectional view along line 18—18 of FIGURE 16 showing the latch arm bearing against the release pin to hold the wheels in a down position; and FIGURE 19 is a sectional view similar to FIGURE 18 showing the latch arm against the stop pin which positions the wheels in the raised position.

Referring to the embodiment of the invention chosen for illustration in FIGURES 1–9, the trailer comprises a frame 20 on which the body of the trailer (not shown) is supported. The frame consists of longitudinal channel members 21 and 22 having angular extensions 23 and 24, respectively, terminating in a trailer hitch 25 of well known construction. A plurality of transverse frame members 26, 27, 28, and 29 serve to secure the frame members 21 and 22 together and angular members 30 and 31 serve to add rigidity to the frame and withstands torsion loads on the frame. The portion of the trailer body extending over the wheels is supported by a plurality of extensions 32a–32d extending on both sides from the cross member 26–29.

The suspension for the wheels consists of a solid torsion bar 35 which is preferably square in cross section as illustrated in FIGURE 9. The torsion bar is snugly received within an opening in a block 36 which is firmly attached to the cross frame member 28. The block 36 contains a screw 37 which engages a dimple in the torsion bar in order to maintain the rod centered with respect to frame. Referring to FIGURE 4, a sleeve member 40 is welded at location 41 to each frame member 20, 21 and each sleeve projects from the frame to rotatably support a second sleeve or tube 42. A channel shaped wheel supporting arm 43 is connected to each tube 42 at weld location 44 and extends in parallel relationship to the frame 20. The end of the sleeve 40 extends outwardly beyond the end of tube 42 and is rigidly secured to an arm 45 connected with frame extension 32c so that the arm 45 serves as additional support for the sleeve 40. The end 35a of the torsion bar 35 extends beyond end 40a of sleeve 40 and snugly through a square opening in a crank arm 48. A set screw 49 in one end of arm 48 engages the end 35a in order to retain the crank arm on the end of the bar 35. The other end of the crank arm 48 is located opposite a plate 50 which is secured to the side of wheel support arm 43 and the end of the arm 48 has an opening 51 which can be placed in alignment with opening 52 in the plate 50 and opening 53 in the support arm 43. A housing 55 is secured to crank arm 48 concentrically about the axis of opening 51 and contains a pin 56 which can project through the openings 51, 52 and 53 in order to lock the crank arm 48 to the wheel support arm 43, thereby securing the wheel support 43 to the torsion rod 35.

As illustrated in FIGURE 1, wheel support arm 43 is rigidly connected at the under surface of its outer end to a shaft 61 supporting the wheel 62 by conventional bearings. Since the arm 48 secures the wheel arm 43 to torsion rod 35, the wheel 62 is suspended by the torsion rod 35. The pin 56 has two parts 56a and 56b carrying adjacent flanges 63 and 64, respectively, and a spring 65 is located between flange 63 and the bottom 59 of housing 55 while a spring 66 is located between flange 64 and washer 60 rigidly attached to housing 55. A pin 67 extends transversely through the end of pin 56b. When the pin 67 is located in the grooves 68 in the edge end of the housing 55, a pin 58 is extended across the end of pin 56b in order to retain the pin 56a in the openings 51, 52, and 53. Pin 58 passes through the extensions 69 and 70 on the end of housing 55 and the end edges of extensions 69 and 70 contain grooves 71 and 72, respectively, which receive the pin 67 after the pin 58 is removed and the pin 56b is moved outwardly and twisted into the dotted line position shown in FIGURE 4. In the full line position shown in FIGURE 4, the expansion force of spring 66 acting on flange 64 overcomes the expansion force of spring 65 acting on flange 63 and holds the end of the pin 56a in the openings 51, 52, and 53 to lock crank arm 48 to the wheel support arm 43. However, when the pin 67 and pin 56b are moved to the dotted line position of FIGURE 4, the force of spring 65 acting on the pin 56a removes the pin from the openings 52 and 53 in order to release the arm 43 from the arm 48 and thereby free the wheel 62 from the torsion bar 35. In other words, because of the arrangement of the springs and pins 56a and 56b, the pin 56a automatically wants to assume a locking position when pin 56b engages pin 56a and moves it against spring 65. When pin 56b is pulled out and compresses spring 66, pin 56a automatically wants to assume the unlocked position because of the force of the freed spring 65.

The member 32c carries a stop plate 75 and tube 42 carries an upright stop 76. After the pin 56 is moved to the unlocked position, the arm 43 is free to move relative to frame 22 and raise wheel 62 until the stop 76 engages the stop plate 75 as illustrated in FIGURE 7. In the raised position, plate 50 is still opposite at least a part of the pin 56 in order to prevent the pin 56 from moving under the arm 43. Thus, when the pin 56 is removed from the openings 52 and 53 to unlock the wheel 62, it continually bears against the plate 50 as the wheel is moved into the raised position corresponding to the position of arm 43 in FIGURE 7. While the above description of FIGURES 1–9 applies primarily to one wheel of the vehicle, the same structure is involved in supporting the other wheel of the vehicle by the torsion bar 35.

In order to suspend the vehicle frame independently of the wheels in order to permit manual movement of the pin 56, the frame member 26 is provided with two lugs 77 and 78 both of which receive a jack screw 79 having a bottom plate 80. In a similar manner, the cross piece 29 has a lug 81 receiving a jack screw 81' having a bottom plate 82. When the trailer frame 20 is attached to an automobile by hitch 25, the jack screws 79 and 81' are normally in the raised position and out of the way of the trailer. However, when it is desired to lower the trailer body prior to moving the trailer into a low garage, the jack screw 79 and 81' are run down into the position illustrated in FIGURE 2, wherein the weight of the trailer is taken off the wheel 62. When the support jacks take over the weight of the trailer, the pin 56 can be normally removed and thereafter, the wheels 62 are freed from the torsion bar 35 since the tube 42 is free to rotate about the fixed sleeve 40. The jack screws 79 and 81' can then be cranked upwardly to gradually let the frame 20 move towards the ground 83 and the wheels 62 will move upwardly with respect to the frame 20. Once the stop 76 hits the plate 75, the wheels 62 will again support the vehicle frame 20 at the elevation illustrated in FIGURE 3.

Caster wheels 84 and 85 are secured to frame members 21 and 22, respectively, forwardly of the wheels 62 and these caster wheels will engage the ground when the stop 76 prevents further movement of wheels 62. Since the center of gravity in the trailer is forward of the wheels 62, the trailer will rest upon the wheels 62 and upon the casters 84 and 85 so that the trailer can be moved while in lowered position. Thus, the trailer can be moved into a low garage or shed for storage and can also be lowered for camping purposes when it is desired to have the trailer body close to the ground.

When it is desired to again return the trailer to its original highway condition, the jack screws 79 and 81 are cranked up into the position shown in FIGURE 2 so that the pin 56 can be again inserted through openings 52 and 53 in order to lock the wheel support arms 43 to the torsion bar 35, the pin 68 being inserted behind the pin 56 into locked position. Thereafter, the jack screws are raised and the trailer is completely suspended by the torsion bar 35 in the normal manner. Referring to FIGURE 10, the jack screws can be replaced by a hydraulic actuator 86 which is pivoted at one end to an arm 87 attached to frame member 22 and at the other end to a link 88 attached to the arm 43. Thus, the actuator 86 can exert a force which pivots the wheel support arm 43 and wheels 62 about the fixed sleeves 40 into the up or down position thereby eliminating the need for the jack screws 79 and 81' carried by the frame. Any suitable source of pressure fluid can be utilized for the actuator 86 and another actuator can be applied to the other wheel support arm if desired.

A modification of the invention is illustrated in FIGURES 11–13 wherein the complete trailer suspension can be fabricated as a separate unit and thereafter attached directly to the frame of the vehicle. Parts the same as those previously described are designated by the same numeral with a prime. In this suspension, the torsion bar 90 is surrounded by two tube sections 91 which extend below the frame members 21 and 22 and are attached to the lower surface of these frame members by cross pieces 93 attached to each of the tube sections. As illustrated in FIGURES 11 and 12, the end portion of 91a of tube section 91 extends beyond the frame member 22 and provides a support sleeve similar to the sleeve 40 in the prior embodiment. A tube or sleeve 42' is pivotally supported on end 91a and is connected to a wheel support arm 43'. The sleeve for 42' is held in position on the end 91a of tube section 91 by a pair of stops 94 and 95 which are welded to the surface of the end 91a. The end 90a of torsion bar 90 extends beyond the end 91a of the tube section 91 and is inserted into an opening in the crank arm 48'. Housing 55' is secured to the arm 48' and contains pin 56' which serves to lock the arm 48' to the wheel support arm 43' in the same manner as in the prior embodiment. The arm 43' carries a plate 50' which maintains the pin 56' in its outer position until it is aligned with openings in the plate 50' and in the arm 43'. A bracket 96 is attached to plate 50' and projects over the crank arm 48' to insure that the arm does not move off the end of the torsion bar. The inner ends of tube sections 91 are rigidly secured to a block 97 which contains an opening for snugly receiving the torsion bar and set screw 98 in block 97 preventing sidewise movement of the bar. The torsion bar 90 is rigidly secured to the frame 20 since tube sections 91 are rigidly secured to the frame. When the arm 43' moves into its upward position, it engages the stop 94, as illustrated in the dotted line position in FIGURE 13.

It is therefore apparent that in the modification of FIGURES 11-13, the complete wheel suspension including the wheels 62', the torsion bar 90, and the tube sections 91 can be placed underneath the frame members 21 and 22 and the members 93 welded thereto and no further attachement is required to provide a suspension for the trailer body. The operation of the jack screws and the pins 56' is the same as described for the prior embodiment in order to release the wheel support arms 43' from the torsion bar 90 and permit the wheels to assume the various positions such as the down position shown in FIGURE 2 and the wheel up position shown in FIGURE 3.

Another modification of the invention illustrated in FIGURES 14-19 also provides a suspension which can be attached to the trailer frame as a complete unit. Parts the same as in the prior embodiment are designated by the same reference numerals with double primes. In this embodiment, the suspension comprises two tube sections 100 which surround a torsion bar 101 and the spaced inner ends of the tube sections are secured rigidly together by a channel member 102 which is welded to each tube section. The inner ends of the tube sections 100 carry identical flanges 103 which contain openings 104 and 105. Pin 106 is fixed in openings 104 and the openings 105 receive a slidable locking pin 56" in a manner presently to be described. A solid block 108 is located between the inner ends of tube sections 100 and has end flanges 109 which support the block 108 for rotation relative to the ends of the tubes. Also, the block has an opening which snugly receive the torsion bar 101 and has a latch 111 which projects outwardly between the flanges 103.

As illustrated in FIGURE 15, the wheel supporting arm 43" connects with a tube or sleeve 42" which is rotatably supported by end 100a of tube section 100 and crank arm 48" has an opening for securely receiving the end 101a of the torsion bar 101. The opposite end of arm 48" is rigidly connected to the wheel support arm 43" by a solid link 112. Thus, the arm 43" is always connected rigidly to the end of the torsion bar 101 and there is no disconnect pin between these members as in the prior embodiment. Stops 94" and 95" are secured to the end 100a of tube 100 on opposite sides of the sleeve 42" in order to maintain sleeve 42' on the end 100 for support thereby. As in the prior embodiment, the upper limit of wheel movement is determined by the engagement of arm 43" with the bracket 94". The complete suspension system is attached to the vehicle frame members 21 and 22 by the cross pieces 93" connected with each of the tube sections 100 as in the prior embodiment.

The torsion bar 101 is connected to the tube sections 100 by the engagement of latch 111 with either removable pin 56" or fixed pin 106. Pin 56" extends along tube section 100 and through housing 55" which contains the same springs (not shown) as in the prior embodiments. A guide bracket 112 is secured to end 100 of tube section 100 and, together with housing 55", supports pin 56" for sliding movement into and out of openings 104. In the normal position with the wheels 62" in the lowered position, pin 56" projects through the two openings 104 and is engaged by the latch 111. The load on the wheels 62" is in a direction to hold the latch 111 against the pin 56" as illustrated in FIGURE 18, so that the trailer load is taken up by the sections of the torsion bar 101 on opposite sides of block 108. When it is desired to lower the body of the trailer, the trailer is first jacked up as illustrated in FIGURE 2 and the pin 56" is then removed from openings 104, permitting the latch 111 to move past the openings 105 and into engagement with the fixed pin 106. When the vehicle has been lowered by the jack screws into the position of FIGURE 3, latch 111 engages pin 106 and the wheels 62" are held in the raised position as illustrated in FIGURE 3 to permit movement of the trailer body into a low garage or other structure. When it is again desired to place the vehicle in a normal traveling position, the trailer body is again raised by the jacks until the latch 111 is above the openings 105, at which time pin 56" can be again inserted through these openings and below the latch 111 to hold the wheels in the down position. This embodiment of the invention has the advantage that only a single pin 56" is required for both the wheels whereas in the prior embodiments, the pin must be removed for each wheel before the trailer body can be let down into its lower position. It is apparent that the structure described for one of the wheels of all embodiments is duplicated for the other wheel even though such structure is not fully illustrated.

By the present invention there is provided a trailer suspension which permits the complete trailer body to be lowered for movement into a low garage or other structure, or for permanent placement without deforming the shape of the trailer body in any manner whatsoever. The torsion bar incorporated in each of the embodiments of the invention is either released from the body or the wheels are released from the torsion bar to permit this relative movement. Various linkage connections can be utilized to accomplish either one of these release operations and it is understood that various lock means can be utilized in connection with these releasable connections. It is also understood that while the torsion bar is shown as a single bar, separate torsion bar pieces can be utilized for each wheel and separately secured to the frame either in a fixed connection or a releasable connection. Also, it is understood that while the invention has been described in connection with a torsion bar suspension, other types of spring means, such as coil springs, can be utilized in connection with suitable means for freeing the wheels for lowering the trailer. Various other modifications are contemplated by those skilled in the art without departing from the spirit and scope of the invention as hereinafter defined by the appended claims.

What is claimed is:

1. A vehicle suspension for supporting a vehicle frame on wheels comprising:
   torsion bar means connected with said frame;
   wheel supporting means connected with said torsion bar means and carrying the vehicle wheels;
   means for rotatably mounting said wheel supporting means on said frame; and
   releasing means for permitting rotative movement only of said wheel supporting means upwardly relative to said vehicle frame without bodily movement of said wheel supporting means sidewise of said frame in order to lower the vehicle frame.

2. A vehicle suspension as defined in claim 1 wherein said releasing means comprises means for disconnecting said torsion bar means from said frame.

3. A vehicle suspension means as defined in claim 1 wherein said releasing means comprises means for disconnecting said wheel supporting means from said torsion bar means.

4. A vehicle suspension as defined in claim 1 having jack means connected with frame and operable independently of said torsion bar means for raising said frame to facilitate actuation of said releasing means.

5. A vehicle suspension as defined in claim 1 having stop means for engaging said wheel supporting means to limit the relative movement of said wheel supporting means so that the wheels of said vehicle will support the vehicle frame in lowered position.

6. A vehicle suspension system comprising:
   torsion bar means extending from each side of a vehicle frame;
   tube means secured to the said vehicle frame and surrounding said torsion bar means adjacent each side of said frame;
   separate wheel support means rotatably mounted on said tube means adjacent each side of said frame;
   first means for connecting each wheel support means to said torsion bar means, and
   second means for connecting said torsion bar means to said frame, one of said connecting means including releasing means for permitting upward rotative movement of said wheel support means relative to said vehicle frame without sidewise bodily movement of said wheel support means relative to said torsion bar means.

7. A vehicle suspension as defined in claim 6 wherein said second connecting means comprises:
   means for rigidly attaching said torsion bar means to said vehicle frame inwardly from the frame sides;
   said releasing means disconnecting said first connecting means to permit movement of said wheel supporting means relative to said torsion bar means.

8. A vehicle suspension as defined in claim 6 wherein said second connecting means comprises means for rigidly attaching said torsion bar means to said tube means inwardly from the frame sides;
   said releasing means disconnecting said first connecting means to permit movement of said wheel supporting means relative to said torsion bar means.

9. A vehicle suspension as defined in claim 6 wherein said second connecting means comprises:
   means for connecting said torsion bar means to said tube means inwardly from the frame sides;
   said releasing means disconnecting said second connecting means to permit movement of said torsion bar means and wheel supporting means relative to said vehicle frame.

10. A vehicle suspension as defined in claim 6 having stop means carried by said wheel supporting means and engaging a limit member rigid with said frame to limit the relative movement of wheel supporting means.

11. A vehicle suspension as defined in claim 6 wherein each wheel support means comprises a support arm rotatably mounted at one end on said tube means and supporting a vehicle wheel at the other end;
   said first connecting means comprising a link connected at one end to said torsion bar means and at the other end to said support arm.

12. A vehicle suspension as defined in claim 11 wherein said releasing means comprises a movable pin for connecting and disconnecting said other end of said link means and said support arm.

13. A vehicle suspension as defined in claim 6 wherein said second connecting means comprises means for supporting said torsion bar means on said tube means, said supporting means being rigid with said torsion bar means and permitting relative rotation between said torsion bar means and said tube means, and latch means extending from said supporting means for transmitting to said torsion bar means the load of said vehicle frame.

14. A vehicle suspension as defined in claim 13 wherein said releasing means comprises a movable pin carried by said frame for positioning said latch means relative to said frame.

15. A locking device for use in a trailer suspension system in which a first member is selectively released from a second member comprising:
   locking pin means supported by one of said members and having first and second pin sections in alignment with each other;
   one of said pin sections normally extending through aligned openings in both said members;
   flanges on the adjacent ends of said pin sections;
   a first spring extending between said one member and the flange on said one pin section;
   a second spring extending between the flange on said other pin section and a spring stop fixed to said one member, and
   retaining means normally holding said pins in end abutment against said springs with said one pin in said openings and releasable to permit said one pin to be moved for locking position by the force of said first spring.

16. A vehicle suspension for supporting a vehicle frame comprising:
   spring means carried by said frame;
   wheel supporting means connected with said spring means and carrying the vehicle wheels;
   means for rotatably mounting said wheel supporting means on said frame; and
   releasing means for permitting rotative movement only of said wheel supporting means upwardly relative to said vehicle frame without lateral movement of said wheel supporting means in order to lower the vehicle frame.

17. A vehicle suspension as defined in claim 16 wherein said releasing means comprises means for disconnecting said spring means from said frame.

18. A vehicle suspension means as defined in claim 16 wherein said releasing means comprises means for disconnecting said wheel supporting means from said spring means.

References Cited

UNITED STATES PATENTS

| | | | |
|---|---|---|---|
| 2,465,098 | 3/1949 | Inskeep | 280—134 |
| 2,540,279 | 2/1951 | Mosier. | |
| 2,656,205 | 10/1953 | Fletcher | 292—61 |
| 2,684,237 | 7/1954 | Kayler. | |
| 2,869,887 | 1/1959 | Westberg | 280—43.23 |
| 2,918,298 | 12/1959 | Starr | 280—43.23 |
| 3,085,817 | 4/1963 | Krause et al. | |
| 3,152,822 | 10/1964 | Griffiths | 292—61 |
| 3,165,332 | 1/1965 | Barker et al. | 280—124 |
| 3,185,330 | 5/1965 | Buckner | 214—506 |

BENJAMIN HERSH, *Primary Examiner.*

C. C. PARSONS, *Assistant Examiner.*